Nov. 11, 1958 E. K. JONES ET AL 2,860,173
MANUFACTURE OF ISOPROPYL BENZENE BY ALKYLATION
Filed Jan. 31, 1955
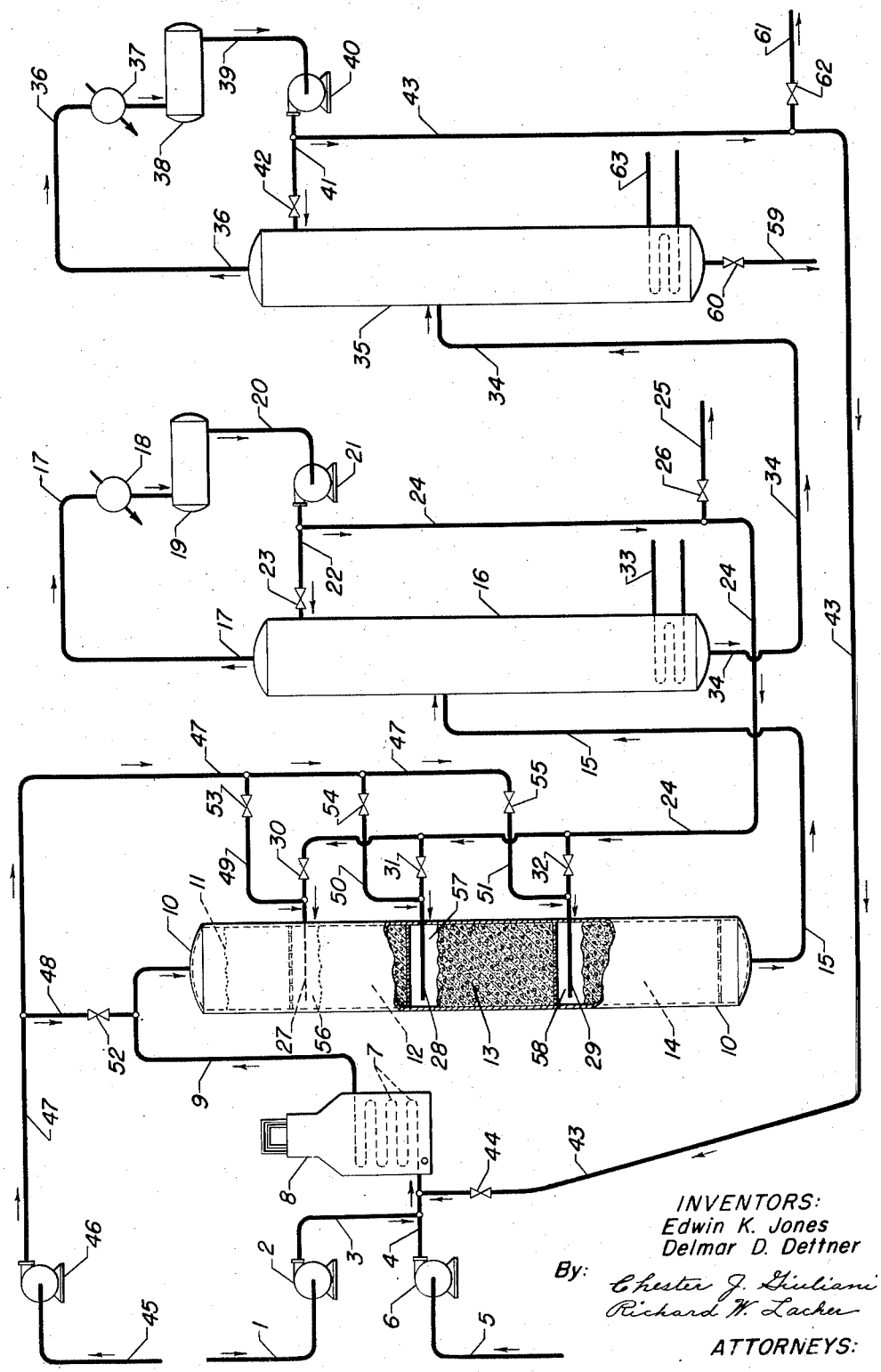
INVENTORS:
Edwin K. Jones
Delmar D. Dettner
By: Chester J. Giuliani
Richard W. Lacher
ATTORNEYS:

United States Patent Office 2,860,173
Patented Nov. 11, 1958

2,860,173

MANUFACTURE OF ISOPROPYL BENZENE BY ALKYLATION

Edwin K. Jones, Evanston, and Delmar D. Dettner, Des Plaines, Ill., assignors to Universal Oil Products Company, Des Plaines, Ill., a corporation of Delaware Application January 31, 1955, Serial No. 485,022

8 Claims. (Cl. 260—671)

This invention concerns the manufacture of mono-isopropyl benzene by the alkylation of benzene with propylene in the presence of so-called solid phosphoric acid catalyst. The invention is particularly directed to improvements resulting in greatly extending the useful life of such catalysts for the benzene-propylene alkylation reaction in conjunction with high yields of mono-isopropyl benzene.

Mono-isopropyl benzene (also known as cumene) is important as a constituent of gasoline-boiling-range motor fuels of high antiknock value. It is also in considerable demand as an intermediate in the synthesis of higher molecular weight aromatic hydrocarbons such as cymene and other polyalkylated benzene hydrocarbons containing at least one isopropyl group per molecule. More recently it has become especially important as an intermediate in the manufacture of phenol.

The use of solid phosphoric acid catalyst for various hydrocarbon alkylation and polymerization reactions has been known for some time. It has also been established that this catalyst is susceptible to deterioration of a largely physical nature by factors tending to alter its moisture content. Consequently, various proposals have been made towards maintenance of uniform hydration of the catalyst while in use.

Loss of moisture causes deterioration of the catalyst by powdering and caking, ultimately resulting in the build-up of such high pressure-drop through the bed of catalyst particles or pellets that processing must be discontinued and the catalyst replaced. On the other hand, excessive moisture accumulation by the catalyst softens the catalyst pellets with similar results.

Moisture loss may occur whenever the catalyst is subjected to a dry atmosphere, and especially when the catalyst is in a heated state. Excessive water content results from exposing the catalyst to a highly moist atmosphere. Various proposals have been made with a view to maintenance of uniform hydration of the catalyst, but these were only partially successful and in some cases actually harmful because the measures suggested attempted to cover too broad an area, either with respect to operating conditions or with respect to the reactions involved.

The problem is especially serious when the catalyst is employed in a highly exothermic reaction such as that with which the present invention is concerned, namely the alkylation of benzene with propylene to produce high yields of monoisopropyl benzene. The formation of one kilogram of the latter releases approximately 250 Calories, much of which is absorbed by the catalyst, causing substantial increases in catalyst temperature and thus increasing the hazard of serious moisture loss.

The present invention makes possible the production of mono-isopropyl benzene in yields approaching the theoretical and for greatly extended periods of operation by means of a unique correlation between the specific reaction, a limited proportion between the benzene and propylene reactants, selected temperature and pressure ranges, and the provision of a moisture concentration within particular limits determined as a function of the temperature and pressure within said selected ranges.

The advantages are enhanced within the scope of the invention by an operation in stages employing a plurality of catalyst beds with provision for assuring the moisture concentration within the particular limits for each bed in a manner which takes care of the heat liberated by the exothermic reaction in each bed.

The invention thus refers to a process for producing mono-isopropyl benzene, wherein a reactant stream comprising benzene and propylene in a molal proportion substantially within the range of from 3:1 to 8:1 is subjected in the presence of a small amount of water to contact with a mass of solid phosphoric acid alkylation catalyst at elevated temperature and pressure, and the invention comprises adding to said reactant stream an amount of water which maintains the mol percentage of water M in the reactant stream within the limits of at least $$M = \frac{0.23t - 46}{P}$$

and not more than $$M = \frac{0.55t - 109}{P}$$

where $t$ is the temperature of the reactant stream entering said catalyst mass in ° C. and $P$ is the pressure in atmospheres, and contacting the resultant reactant stream with the catalyst mass at a temperature within the range of from 204° to 260° C. and a pressure substantially within the range of from 25 to 60 atmospheres.

Benzene for use as reactant in the process of this invention is obtainable from several sources including the distillation of coal, the dehydrogenation of naphthenic hydrocarbon fractions containing cyclohexane, and the dehydrogenation and cyclization of aliphatic hydrocarbons containing 6 carbon atoms per molecule in straight-chain arrangement, such as normal hexane and the straight-chain hexenes.

Propylene utilized as alkylating agent in the present process may be obtained from gases produced in the cracking of petroleum hydrocarbons, by the dehydration of propyl or isopropyl alcohols, and by any other suitable means which result in the formation of either substantially pure propylene or a hydrocarbon fraction containing substantial amounts of this olefinic hydrocarbon. Such fractions containing propylene also generally contain certain amounts of propane when they are derived from gases produced by cracking or dehydrogenation of hydrocarbons. It has been found that propylene-propane mixtures containing as little as 33 percent propylene, when used in accordance with the conditions prescribed by the present invention, give propylene conversions substantially equivalent to conversions obtained from fractions containing 95 percent propylene or more. Moreover, the yield of mono-isopropyl benzene, based upon the propylene converted, will be at least as high when using a $C_3$ fraction containing substantial amounts of propane as when using a fairly pure propylene fraction.

Solid phosphoric acid catalysts utilized in the present alkylation process are of the type well known to the art. They may be made by mixing an acid of phosphorus such as ortho-, pyro-, or tetra-phosphoric acid with a finely divided generally siliceous solid carrier (such as diatomaceous earth, prepared forms of silica, raw and acid-treated clays, and the like) to form a wet paste; calcining at temperatures generally below about 500° C.

to produce a solid cake; grinding and sizing to produce particles of usable mesh. If the calcination is carried out at temperatures above about 300° C, it may be desirable to rehydrate the catalyst granules at a temperature between about 200° and about 300° C., and preferably at about 260° C. to produce an acid composition corresponding to high alkylating activity. The catalyst preparation procedure may be varied by forming particles of the original paste, by extrusion, or by pelleting methods, after which the formed particles are calcined and, when necessary rehydrated.

In the reactions taking place during calcination it is evident that some acid is "fixed" on the carrier and it is probable that some metaphosphoric acid, which is not as active under these conditions, may be formed. The rehydrating step produces an acid composition corresponding closely to the pyro-acid having the formula $H_4P_2O_7$. Unless rehydration is practiced the temperature of approximately 300° C. should generally not be exceeded in the calcination step. A solid phosphoric acid catalyst prepared from a major proportion by weight of a phosphoric acid having at least as large a water content as that of the pyro-acid and a minor proportion of siliceous carrier such as kieselguhr is preferred for use in the present process.

In effecting reaction between benzene and propylene according to the process of the present invention, the reactant hydrocarbons are subjected to contact with the solid phosphoric acid catalyst at a temperature within the range of from 204° to 260° C. It has been found that at temperatures within this range the reaction proceeds at a practicable rate and the catalyst hydration is readily controlled. At temperatures above this range the tendency toward side reactions and toward carbonization of the catalyst becomes severe and maintenance of the necessary close control of the state of hydration of the catalyst becomes difficult because of the increased tendency of the catalyst to lose water at high temperatures and also because the increased rate of reaction brings about such extremely different temperature conditions between the inlet and outlet of the catalyst bed that provisions for suitable water introduction to meet the requirements of the catalyst under these extreme conditions is either difficult or impossible.

The process of the invention is performed at pressures substantially within the range of from 25 to 60 atmospheres. Pressures in this range are necessary at the aforesaid temperatures to assure maintenance of at least a portion of the reactants in liquid state, which generally enhances the catalyst life. Subjection of the benzene and propylene reactants to contact with the catalyst in a proportion of at least 3 mols of benzene per mol of propylene is necessary in accordance with the process of the invention to achieve maximum yields of mono-propylated benzene, minimum formation of propylene polymers and also to assure maintenance of a substantial proportion of liquid phase material, as mentioned above. A proportion of benzene to propylene greater than 8:1 does not have any material effect on the desired reaction and imposes an unnecessary burden on the product fractionation.

The liquid-vapor phase relationships occurring during the reaction are of a highly complex order and, indeed, impossible to calculate with reasonable accuracy owing to the progressive formation of isopropyl benzene from inlet to outlet of the reaction zone, accompanied by simultaneous disappearance of propylene, and also because of the changing temperature conditions throughout the catalyst bed. It is this situation which has made the problem of maintenance of uniform catalyst moisture content a difficult one. The solution of the problem accomplished by the present invention involves essentially the introduction of only sufficient water to provide a water vapor content in the vapor phase which will be in substantial agreement with the effective water vapor pressure of the catalyst under the selected conditions of temperature, pressure and hydrocarbon environment. Whatever the mechanics of the situation, it has been discovered that by maintaining the mol percentage of water in the total reactant stream entering into contact with the catalyst within the limits determined by the two equations given above, the useful life of the catalyst can be extended far beyond periods heretofore possible. It is to be understood that the water may be introduced into the reaction zone in the liquid or vaporous form or in chemically combined state as a compound which liberates water by its decomposition at the conditions prevailing in the reaction zone. The alcohols are suitable as suppliers of water, especially the lower molecular weight aliphatic alcohols, such as the propyl alcohols.

A temperature increase from the inlet to the outlet end of the catalyst bed aggravates the difficulty of maintaining optimum uniform catalyst moisture contents. Attempts at water addition at a multiplicity of points throughout the bed have been unsuccessful because of problems of distribution causing excessive moisture content at local areas near the point of distribution and inadequate moisture elsewhere. In the present process, therefore, the water is introduced into the reactant stream while the latter is not in contact with the catalyst. The amount of the water must be regulated to satisfy as nearly as possible the temperature conditions at both inlet and outlet of the bed. That is, the water added must not be so large in amount as to damage the lower temperature catalyst near the inlet nor so small in amount as to permit harmful dehydration of the catalyst near the outlet of the bed.

Temperature being the important factor here, it is a further feature of the present invention to limit the temperature increase from inlet to outlet of the catalyst bed to not more than 25° C. Preferably, the temperature increase should not exceed 15° C.

This limitation presents problems of design in the commercial application of the reaction. To achieve substantially complete conversion of propylene at commercially feasible rates of reactant throughput by the use of a single stationary bed of catalyst would require either a catalyst bed of such a depth that this temperature limitation would be greatly exceeded, or a catalyst bed of such a large cross-section as to be impractical from a design standpoint. Conceivably, this difficulty might be circumvented by dividing the reactant stream into a number of smaller streams which are passed through separate catalyst beds in parallel. This method is undesirable however because of the complicated and expensive piping and flow control requirements involved. As a further feature of the present invention, therefore, a method is provided which is not only adapted to high throughput rates and simple, economic design and construction costs, but at the same time permits excellent protection of the catalyst with regard to maintenance of uniform water content. In this method, the reactants are passed through a plurality of separate beds of the catalyst, arranged in series, whereby additional water may be introduced into the reaction mixture after its discharge from one bed and before it comes into contact with the next one of the successive beds of the catalyst, according to the requirements of each bed. In this mode of operation the requirement of additional water is determined primarily by the temperature of the reactant stream entering each bed. The separate catalyst beds may be located in individual chambers with interconnecting piping, or two or more or even all of the beds may be disposed in a single chamber, but spaced one from the other by grid plates or other convenient means, with sufficient space between beds to permit admission and thorough distribution of water, or any of several known compounds capable of forming water under the conditions obtaining, into the reactants before the latter contact the next succeeding catalyst bed. This feature of the invention permits readjustment of the water content of the reactants to meet the requirements of that portion of the catalyst which would otherwise be opertaing at an excessive temperature having regard to the water content of the reactants passing therethrough. The arrangement thereby facilitates observance of the prescription that the temperature variation from inlet to outlet of a given catalyst bed shall not exceed 25° C.

An especially preferred arrangement of the plurality of separate catalyst beds in accordance with the invention is one wherein the second bed of the series is larger in volume than the first. This feature provides a substantial economy in the form of a lower total reaction chamber volume. If there are three beds, the third will be at least as large in volume, and preferably will be larger, than the second. Where more than three beds are used, each successive bed beyond the third will be at least as large as the third, and there will be at least theoretical advantage if each is larger than the bed next preceding it. This arrangement of the beds in increasing volume in the direction of flow of the reactants will be understood to be permissible when it is considered that when using a 3 to 1, or higher, ratio of benzene to propylene in the reactant stream, the rate of reaction (that is, the rate of formation of isopropyl benzene per unit of time) still diminishes as the reaction proceeds despite the temperature increase toward the outlet of the reaction zone. This decrease in reaction rate occurs by reason of gradual dilution of the reactants resulting from progressive disappearance of propylene and benzene and the continuous formation of reaction products therefrom, so that there is a continuous increase in the concentration of that product in the reactant stream as that stream progresses through the series of catalyst beds.

A further feature of the invention which is adapted for use in conjunction with the aforesaid arrangement of the catalyst mass in separate beds is the provision for introduction into the reactant stream of an inert cooling, or quenching, medium which serves to reduce the temperature of the reactants before contact thereof with successive portions of the catalyst. Thus the quenching medium, which is usually a liquid, and preferably a hydrocarbon, such as propane, will be introduced at a point between the first and second catalyst beds and, if desired, also at any or all of the points between successive catalyst beds. It is desirable when a quenching medium is used, that it be supplied in such an amount that the temperature of the reactants entering each successive catalyst bed is within 10° C. above the temperature of the reactants entering the last preceding catalyst bed. It can readily be seen that the use of this quench, by effecting a more nearly uniform catalyst temperature throughout the series of catalyst beds will substantially reduce, and may even eliminate, the necessity of introducing additional water between the first and second beds and/or at successive inter-bed points. The use of quench, however, cannot eliminate or even reduce water introduction requirement before entry of the reactants into the first catalyst bed. The quench, as a matter of fact, is not in any sense a complete alternative to the addition of water because of the dilution effects which accompany its use. The application of quench is preferably in limited amounts where circumstances render the dilution effect not serious and/or where temperatures are nearer the 260° C. upper limit than the 204° C. lower limit for operation in accordance with the invention.

The attached drawing illustrates diagrammatically an arrangement suitable for carrying out the process of the invention. The drawing illustrates the use of a series of catalyst beds increasing in volume in the direction of flow of the reactants and contained in a single vessel. This is the preferred method of operation, but it is understood that the invention is not to be limited thereto.

Referring to the drawing, a propylene stream, or a stream consisting essentially of the propane-propylene portion of the gases produced for example in a hydrocarbon oil cracking process, is introduced through line 1 to pump or compresser 2 which discharges through line 3 leading to line 4 through which flows the benzene reactant being introduced through line 5 and pump 6. The commingled streams pass through line 4 to heater 8 containing heating coils 7, passing from the heater through line 9 into the top of the reactor 10. The reactants pass downwardly through reactor 10, thereby passing through a series of catalyst beds 11, 12, 13 and 14. Each catalyst bed is of larger volume than those preceding it. There is no fixed relationship between the sizes of the respective beds. Satisfactory results are obtained when the sizes of the several catalyst beds are volumetrically proportioned within the following limits:

| Bed No. | 1 | 2 | 3 | 4 |
|---|---|---|---|---|
| Relative Size | 1 | 1-1.67 | 1-2.67 | 1-4.33 |

Typical of a preferred distribution of catalyst is one wherein the respective beds increase in volume in sequence, in proportion to the numbers 3, 4, 6 and 9. Where desired, a larger number of catalyst beds, for example up to as many as 6 or more, may be employed. The several beds of catalyst may be supported in the reaction chamber in any convenient manner, such as by means of supporting grids resting upon lugs welded to the inside wall of the reactor. Substantial open spaces are provided between the several catalyst beds, as indicated at 56, 57 and 58, the volumes of these spaces being sufficient to permit the introduction of water and/or an inert quenching medium and thorough mixing of either or both of these added materials in the reactant stream before the latter enters the next succeeding catalyst bed.

The reaction product is withdrawn from reactor 10 through line 15 and passed to fractionating column 16 which serves as a depropanizing column. In this column an overhead stream containing substantially all $C_3$ material in the reaction products (propane contained in the $C_3$ charge to the process and any unconverted propylene) is withdrawn through line 17 and condenser 18 to receiver vessel 19. From receiver 19, the essentially propane overhead is withdrawn through line 20 to pump 21 which discharges the material into line 22. A portion of the propane is returned through line 22 and valve 23 to the upper portion of column 16, as reflux. Another portion is passed from line 22 to storage by way of lines 24 and 25 and valve 26. When it is desired to recycle propane to the reactor as quenching medium, a further portion may be introduced in liquid state into the reactor at any or all of the points in between the several catalyst beds by way of lines 27, 28 and 29 which join line 24, the respective amounts of quenching propane employed being regulated by valves 30, 31 and 32. Those portions of lines 27, 28 and 29 which are within the reactor 10 will be provided with suitable means for efficiently distributing the propane into the reactant stream.

Heat for effecting the removal of the $C_3$ material in fractionating column 16 is furnished through heating coil 33. Reaction product free of propane is withdrawn from the bottom of column 16 and passed through line 34 into fractionating column 35 which serves to separate an overhead stream of unconverted benzene from a bottoms product of the desired mono-isopropyl benzene. Benzene is withdrawn through overhead line 36 and condenser 37 to receiver 38 from which pump 40 draws benzene through line 39, discharging same partly as reflux to the column through line 41 and valve 42, and partly as recycle benzene which passes through line 43 and valve 44, discharging into line 4 which receives the fresh supplies of propylene and benzene.

Water to be introduced into the system for maintenance of the prescribed water concentration in the reactant stream in accordance with the invention is supplied by line 45 and pump 46 to line 47 which in turn leads to lines 48, 49, 50 and 51. Line 48 supplies water to the reactant stream initially entering the reactor 10, the amount introduced being regulated by valve 52. This initial water introduction can be achieved by any of various alternative methods within the contemplation of the invention, but not shown in the drawing. For example, instead of injecting the water into line 9 by way of line 48, it could as well be injected into either line 1 or line 3 through which the fresh propylene or propane-propylene is supplied, or into line 5 supplying the fresh benzene. Still another method of adding the initial water requirement is to pass either or both reactant charge stream, the combined charge streams, the recycle benzene stream or the total combined feed stream through a water-containing vessel wherein the hydrocarbon stream is contacted with water under such conditions of temperature and flow rate that the amount of water incorporated in the hydrocarbon will give a water concentration in the total hydrocarbon stream passing into the first catalyst bed which is within the limits prescribed by the invention.

Line 49 supplies water to the space 56 between catalyst beds 11 and 12 by way of line 27, the amount introduced being regulated by valve 53. Similarly lines 50 and 51, which connect with lines 28 and 29, permit to supply water to the reaction stream in spaces 57 and 58, the respective amounts being regulated by valves 54 and 55. If desired, the inlet piping and distribution means for the water introduction may be maintained separate and independent from the system used for supplying quenching medium to the reactor. In general, it is preferred that the water be introduced in vaporous state into the reactor, and any necessary heating for this purpose can be accomplished by any convenient means, not shown in the drawing.

There will occasionally be an accumulation of contaminants in the benzene recycle stream passing through line 43 to line 4, as a result of minor side reactions such as propylene polymerization. This accumulation may be reduced whenever desirable by intermittent withdrawals of benzene through line 61 containing valve 62, or it can be maintained at any desirable low point commensurate with economic operation by continuous withdrawal of a small "drag-stream" through line 61. Heat for the separation of benzene from isopropyl benzene in column 35 is furnished by heating coil 63. The isopropyl benzene product of the process is withdrawn from column 35 through line 59 containing valve 60, and when the process is operated in accordance with the prescriptions of the invention, this product will be of unusually high quality, containing 20 or more mols of mono-isopropyl benzene per mol of poly-isopropyl benzene. The latter, when desired, may be separated from the mono-isopropyl benzene by fractionation or other suitable means not shown in the drawing. The concentration of unsaturates in the alkylate product, present for example in the form of higher propylene polymers, will be low, as indicated by bromine numbers of less than 1.0, usually on the order of 0.5.

It is understood that when propylene is charged to the system in a relatively pure form (that is, rather than as a propane-propylene mixture) the depropanizing column 16 will be eliminated from the system, and the quenching medium, if used, will be supplied from another source.

EXAMPLE I

In a series of three runs a stream of substantially pure benzene was continuously reacted with propylene contained in a propane-propylene stream which was separated from refinery cracking gases and which contained about 51 weight percent propylene. The streams were continuously commingled, passed through a preheater to bring them to reaction temperature and then passed downwardly through a stationary bed of a commercial solid phosphoric acid catalyst having a volume of 500 ml. and contained in a cylindrical reaction zone. An excess of benzene was employed. The reaction products were withdrawn from the bottom of the reaction zone and passed into a fractionating column to separate an overhead fraction consisting of propane and unconverted propylene from a bottoms fraction consisting of isopropyl benzene, unconverted benzene and minor amounts of products of side reactions. The bottoms fraction was passed to a second fractionating column where an overhead stream of unconverted benzene was separated from a bottoms stream of crude isopropyl benzene. The unconverted benzene was re-used by commingling it with the combined streams of fresh benzene and propane-propylene. The crude isopropyl benzene was analysed for mono-isopropyl benzene content.

Regulated amounts of water were continuously introduced into the reactant stream prior to contact of the latter with the catalyst. The following reaction conditions were established and maintained for each of the three runs:

| | |
|---|---|
| Pressure, atmospheres | 34 |
| Temperature, ° C., at inlet to catalyst bed | 220 |
| Propane-proplene charge: | |
| Propylene rate— | |
| Grams/hour | 77.8 |
| Mols/hour | 1.85 |
| Propane rate— | |
| Grams/hour | 75.5 |
| Mols/hour | 1.71 |
| Fresh benzene charge— | |
| Grams/hour | 132.8 |
| Mols/hour | 1.70 |
| Recycle benzene— | |
| Grams/hour | 714.6 |
| Mols/hour | 9.15 |
| Mol ratio, total benzene to propylene | 5.9 |
| Charge rate of combined reactants, measured as liquid, ml./hour | 1250 |
| Space velocity, vols. liq./vol. cat./hour | 2.5 |

The following quantities of water were introduced (as steam) into the combined reactant stream before contact of the latter with the catalyst.

*Water rates*

| Run No. | 1 | 2 | 3 |
|---|---|---|---|
| Grams water/hour | 10 | 0.65 | 0.91 |
| Mols water/hour | 0.56 | 0.036 | 0.05 |
| Mol percent water based on hydrocarbons | 3.9 | 0.25 | 0.35 |
| Weight percent water based on hydrocarbons | 1.0 | 0.065 | 0.09 |

After the start-up of each run and upon establishment of smooth operating conditions, the percentage conversions of the propylene and benzene reactants and the yield of mono-isopropyl benzene were determined. Also the temperature of the reaction mixture leaving the catalyst bed was noted. These data are listed below, being the same for all three runs (within experimental error) because of the identity of conditions, except for the differing water rates, which had no detectable effect upon the reaction per se:

| | |
|---|---|
| Yield, mono-isopropyl benzene: | |
| Grams/hour | 196 |
| Mols/hour | 1.63 |
| Propylene reacted: | |
| Grams/hour | 75 |
| Mols/hour | 1.79 |
| Percent of reacted propylene accounted for as mono-isopropyl benzene | 91 |
| Benzene reacted: | |
| Grams/hour | 133 |
| Mols/hour | 1.7 |
| Percent of reacted benzene accounted for as mono-isopropyl benbene | 96 |
| Temperature of reaction product, ° C. | 258.5 |

Each of the three runs was continued for an extended time, with periodic observation of results. In the case of Run No. 1, at 80 hours a considerable build-up of pressure drop through the catalyst bed was noted, and this difficulty became aggravated, necessitating discontinuance of the run at 95 hours. Inspection of the used catalyst showed that it had become severely caked throughout the bed from a large excess of moisture.

Run No. 2 was continued without sign of difficulty for a considerably extended period, namely for 210 hours, when a very slow increase in pressure drop became noticeable. Shut-down did not become necessary until after 405 hours of continuous operation. It was discovered that the lower portion of the catalyst bed (toward the exit end) had powdered as a result of dehydration. The water introduction in this run was about mid-way between the limits determined by applying in the two equations $$\left(M=\frac{0.55t-109}{P} \text{ and } M=\frac{0.23t-46}{P}\right)$$

the inlet temperature of 220° C. and the pressure of 34 atmospheres.

Run No. 3 continued smoothly until an increase in pressure drop became noticeable at 940 hours. This worsened gradually, and the run was discontinued at 1400 hours. In this case, inspection of the catalyst showed that the middle portion of the bed was in excellent condition, but caking had developed slightly at the inlet and more seriously toward the lower, exit end. The water introduction of 0.35 mol percent during the run represented about the maximum permitted by the equation $$M=\frac{0.55t-109}{P}$$

for the inlet temperature of 220° C.; however, the temperature rise through the bed appeared to have caused gradual dehydration of the catalyst near the outlet of the bed.

EXAMPLE II

This example illustrates the advantage of dividing the catalyst mass into individual beds. Two separate runs were made using the same reactant flow and recycle rates, pressure, inlet temperature and total catalyst volume as in the runs of Example I. However, for the first run of this example (Run No. 4), the catalyst was placed in the reaction chamber in a series of three beds of equal volume (167 ml. each), with sufficient space between beds to permit introduction, and mixing of additional water in the reactant stream. The reaction chamber was correspondingly larger than for Runs 1 to 3. The temperature profile through the reaction zone, for smooth operation, is tabulated below with data showing the respective amounts of water introduced into the reactant stream.

Run No. 4

| Catalyst Bed No. | Inlet Temp., ° C. | Outlet Temp., ° C. | $\Delta t$, ° C. |
|---|---|---|---|
| 1 | 220 | 240 | 20 |
| 2 | 240 | 251 | 11 |
| 3 | 251 | 258 | 7 |
| Total $\Delta t$ | | | 38 |

Water injection:
    Before catalyst bed No. 1, grams/hour _____ 0.81
        As mol percent of hydrocarbons _____ 0.31
    Between cat. beds Nos. 1 and 2, grams/hour__ 0.33
        As mol percent of hydrocarbons _____ 0.13
        Cumulative mol percent _____ [1] 0.97
    Between cat. beds Nos. 2 and 3, grams/hour_ 0.39
        As mol percent of hydrocarbons _____ 0.17
        Cumulative mol percent _____ [1] 0.67

[1] Corrected for decreasing molal content of reaction mixture resulting from reaction.

This run was terminated after 1500 hours of completely steady operation. Inspection of the used catalyst indicated no trace of deterioration in any of the three beds.

In the second run of this example (Run No. 5), the catalyst was distributed in the reaction chamber in just two beds, the second being considerably larger in volume (315 ml.) than the first (185 ml.). The necessary reaction chamber volume was larger than for Runs 1 to 3, but smaller than for Run No. 4. The temperature profile through the catalyst, with smooth operation, and the water injection data were as follows:

Run No. 5

| Catalyst Bed No. | Inlet Temp., ° C. | Outlet Temp., ° C. | $\Delta t$, ° C. |
|---|---|---|---|
| 1 | 220 | 242 | 22 |
| 2 | 242 | 258 | 16 |
| Total $\Delta t$ | | | 38 |

Water injection:
    Before catalyst bed No. 1, grams/hour _____ 0.78
        As mol percent of hydrocarbons _____ 0.30
    Between catalyst beds Nos. 1 and 2, grams/hour _____ 0.66
        As mol percent of hydrocarbons _____ 0.27
        Cumulative mol percent _____ [1] 0.60

[1] Corrected for decreasing number of mols in reaction mixture resulting from reaction.

This run was equally as successful as Run No. 4, there being no sign of catalyst deterioration after 1500 hours. Aside from the conversions of propylene and benzene, and yield of mono-isopropyl benzene, which were substantially the same as in Run No. 4 and in the earlier stages of Runs 1 to 3, this run (No. 5) shows that the number of separate catalyst beds may be decreased by increasing the volumes of the beds in the direction of flow of the reactant. In installations of commercial scale, this permits a significant economy in the form of a smaller total reaction zone space requirement.

EXAMPLE III

This example shows how the use of separate catalyst beds increasing in volume in the direction of flow of the reactants and injection of water at several points were advantageously applied in the production of cumene from benzene and a relatively more pure propylene fraction (95 mol percent). The total catalyst volume and the flow rates of propylene, fresh benzene and benzene recycle were substantially the same as in the previous runs. It was estimated by calculation that these conditions would produce an overall temperature increase of about 50° C. This was expected to be greater than in the previous runs due to the smaller amount of propane in the present run. In Runs 1 to 5, the propane had absorbed a significant amount of the reaction heat. Accordingly, the catalyst was loaded into the reaction chamber in four separate beds, as follows:

| Bed No. | 1 | 2 | 3 | 4 |
|---|---|---|---|---|
| Catalyst volume, ml. | 75 | 105 | 140 | 180 |

After commencing operation (Run No. 6) and starting the introduction of water ahead of catalyst bed No. 1, between beds Nos. 1 and 2 and between beds Nos. 2 and 3, a stable, substantially trouble-free operation resulted which was continued for over 1600 hours and then voluntarily stopped. The essential data descriptive of this operation are as follows:

*Run No. 6*

| | |
|---|---|
| Pressure, atm | 34 |
| Propylene charge: | |
|    Grams/hour | 77.8 |
|    Mols/hour | 1.85 |
| Propane (contaminant): | |
|    Grams/hour | 4.4 |
|    Mols/hour | .10 |
| Benzene charge: | |
|   Fresh— | |
|     Grams/hour | 137.4 |
|     Mols/hour | 1.76 |
|   Recycle— | |
|     Grams/hour | 710 |
|     Mols/hour | 9.09 |
| Mol ratio, total benzene to propylene | 5.9 |
| Charge rate of combined reactants, measured as liquid, ml./hour | 1116 |
| Space velocity, vols. liq./vol. cat./hour | 2.23 |
| Temperatures, °C.: | |
|   Inlet to catalyst bed No. 1 | 210 |
|   Inlet to catalyst bed No. 2 | 226 |
|   Inlet to catalyst bed No. 3 | 242 |
|   Inlet to catalyst bed No. 4 | 252 |
|   Outlet of catalyst bed No. 4 | 259.5 |

Water injection rates:

| | Inlet to Catalyst Bed No. | | | |
|---|---|---|---|---|
| | 1 | 2 | 3 | 4 |
| Grams/hour | 0.4 | 0.37 | 0.45 | |
| As mol percent of hydrocarbon | 0.18 | 0.17 | 0.22 | |
| Cumulative mol percent [1] | 0.18 | 0.35 | 0.59 | 0.61 |
| Mol percent per maximum equation | 0.19 | 0.45 | 0.71 | 0.87 |
| Mol percent per minimum equation | 0.07 | 0.18 | 0.29 | 0.35 |

[1] Corrected for decreasing number of mols in reaction mixture.

| | |
|---|---|
| Yield, mono-isopropyl benzene: | |
|   Grams/hour | 202 |
|   Mols/hour | 1.68 |
| Propylene reacted: | |
|   Grams/hour | 75.8 |
|   Mols/hour | 1.8 |
| Wt. percent of reacted propylene accounted for as mono-isopropyl benzene | 93 |
| Benzene reacted: | |
|   Grams/hour | 137.4 |
|   Mols/hour | 1.76 |
| Wt. percent of reacted benzene accounted for as mono-isopropyl benzene | 95.5 |

In this run the introduction of additional water between catalyst beds Nos. 3 and 4 was unnecessary because the temperature increase in bed No. 4 (7.5° C.) was so small as not to require further water.

EXAMPLE IV

This example illustrates an operation on a larger scale in which 85.9 cubic meters per day of a propane-propylene fraction (containing about 57.5 mol percent propylene) was commingled with 282.3 cubic meters per day of fresh and recycled benzene, the combined stream was preheated to 210° C. and passed through a reaction chamber containing five separate beds of a solid phosphoric acid catalyst. The effluent from the reaction chamber was fractionated to remove an overhead stream of propane and unconverted propylene from a bottoms stream of crude alkylate. A portion of the overhead stream was recycled to the reaction chamber and injected therein at points between the beds in sufficient amount to keep the reactor temperature below 232° C. The crude alkylate was first fractionated to recover un-converted benzene, which was combined as recycle with the propane-propylene and fresh benzene streams, and then fractionated to remove reaction products higher-boiling than the mono-isopropyl benzene product. The reaction chamber had a height of 11.7 meters. The total loading of catalyst was 5,988 kilograms distributed in the five beds as follows:

| Bed No. | 1 | 2 | 3 | 4 | 5 |
|---|---|---|---|---|---|
| Depth of bed, meters | 0.46 | 0.61 | 0.91 | 1.37 | 1.68 |

The operation is described by the following data:

| | |
|---|---|
| Propane-propylene charge rate, cubic meters per day | 85.9 |
| Benzene charge rate: | |
|   Fresh, cubic meters per day | 46.3 |
|   Recycle, cubic meters per day | 236 |
| Combined feed ratio, mols total benzene per mol propylene | 5.4 |
| Propane recycled to reaction chamber as quench: | |
|   Between beds Nos. 1 and 2, cubic meters per day | 20.7 |
|   Between beds Nos. 2 and 3, cubic meters per day | 44.2 |
|   Between beds Nos. 3 and 4, cubic meters per day | 24.3 |
| Water injection: | |
|   Before No. 1 catalyst bed, liters/hour | 4.92 |
|   Between No. 1 and No. 2 catalyst beds, liters/hour | 4.92 |
| Reaction chamber pressure, atm | 34 |
| Reaction chamber temperatures, °C.: | |
|   No. 1 cat. bed— | |
|     Inlet | 210 |
|     Outlet | 223 |
|   No. 2 cat. bed— | |
|     Inlet | 219 |
|     Outlet | 229 |
|   No. 3 cat. bed— | |
|     Inlet | 219 |
|     Outlet | 229 |
|   No. 4 cat. bed— | |
|     Inlet | 224 |
|     Outlet | 228 |
|   No. 5 cat. bed— | |
|     Inlet | 228 |
|     Outlet | 227 |
| Products yield, cubic meters per day: | |
|   Cumene | 62.5 |
|   Propane | 40.9 |
|   High-boiling products | 2.7 |

The indicated water injections were well within the limits fixed by the equations of the present invention. The use of the quench as shown, substantially reduced the total temperature increase through the reaction chamber, correspondingly reduced the water requirement between catalyst beds Nos. 1 and 2, and eliminated all water requirements at subsequent inter-bed points.

In all of the foregoing examples, the runs described were made with reactants supplied in substantially dry state to the system. It is understood that when either or both reactant streams contain appreciable water, the amount thereof should be determined by analysis, and the amount so present must be subtracted from the total amount to be introduced for dry reactant streams as determined by the equations of the present invention. It is further understood that in the case of excessive water content in the reactants, the water content must be reduced to the amount determined by the aforesaid equations before they are introduced into contact with the catalyst.

We claim as our invention:

1. A process for producing mono-isopropyl benzene, which comprises contacting a reactant stream comprising benzene and propylene in a molal proportion substantially within the range of from 3:1 to 8:1 with a mass of solid phosphoric acid alkylation catalyst in the form of at least two successive separate catalyst beds at a temperature within the range of from 204° to 260° C. and a pressure substantially within the range of from 25 to 60 atmospheres in the presence of a small amount of water sufficient to maintain the catalyst in a state of hydration, and so proportioning the volumes of catalyst contained in said successive beds that the temperature rise through each catalyst bed does not exceed 25° C.

2. Process as claimed in claim 1, characterized in that the second one of the successive catalyst beds contains a larger volume of catalyst than the first bed.

3. Process as claimed in claim 2, characterized in that more than two successive catalyst beds are used and each of the catalyst beds beyond the second bed contains at least as large a volume of catalyst as the next preceding bed.

4. Process as claimed in claim 1, characterized in that the reactants are passed through a catalyst mass in the form of at least four successive separate beds, the second, third and fourth of which contain catalyst volumes proportioned within the respective ranges of from 1 to 1.67, from 1 to 2.67, and from 1 to 4.33 times the volume of catalyst contained in the first catalyst bed.

5. Process as claimed in claim 1, characterized in that a liquid hydrocarbon quenching medium is introduced into the reaction mixture between the first and second catalyst beds in an amount which reduces the temperature of the reaction mixture to within 10° C. above the temperature of the reactant stream entering the first catalyst bed.

6. Process as claimed in claim 5, characterized in that the reaction mixture issuing from a catalyst bed subsequent to the first catalyst bed of the series is commingled with not more than such an amount of liquid quenching medium as reduces the temperature of the reaction mixture entering the next succeeding bed to within 10° C. above the temperature of the reaction mixture entering the last preceding catalyst bed.

7. Process as claimed in claim 5, characterized in that the quenching medium consists essentially of liquid propane.

8. A process for producing mono-isopropyl benzene which comprises contacting a reactant stream comprising benzene and propylene in a molal proportion substantially within the range of from 3:1 to 8:1 with a mass of solid phosphoric acid alkylation catalyst in the form of at least two successive separate catalyst beds at an alkylation temperature and a pressure substantially within the range of from about 25 to 60 atmospheres in the presence of a small amount of water sufficient to maintain the catalyst in a state of hydration, and so proportioning the volumes of catalyst contained in said successive beds that the temperature rise through each catalyst bed does not exceed 15° C.

References Cited in the file of this patent

UNITED STATES PATENTS

| | | |
|---|---|---|
| 2,382,318 | Ipatieff et al. | Aug. 14, 1945 |
| 2,431,166 | Buell et al. | Nov. 18, 1947 |
| 2,439,080 | Davies et al. | Apr. 6, 1948 |
| 2,512,562 | Cummings | June 20, 1950 |
| 2,632,692 | Korin et al. | Mar. 24, 1953 |
| 2,681,374 | Bethea | June 15, 1954 |
| 2,713,600 | Langlois | July 19, 1955 |